March 2, 1954  G. A. KENDALL ET AL  2,670,646
CENTER DRIVE CHUCK FOR CRANKSHAFT LATHES
Filed Dec. 15, 1950
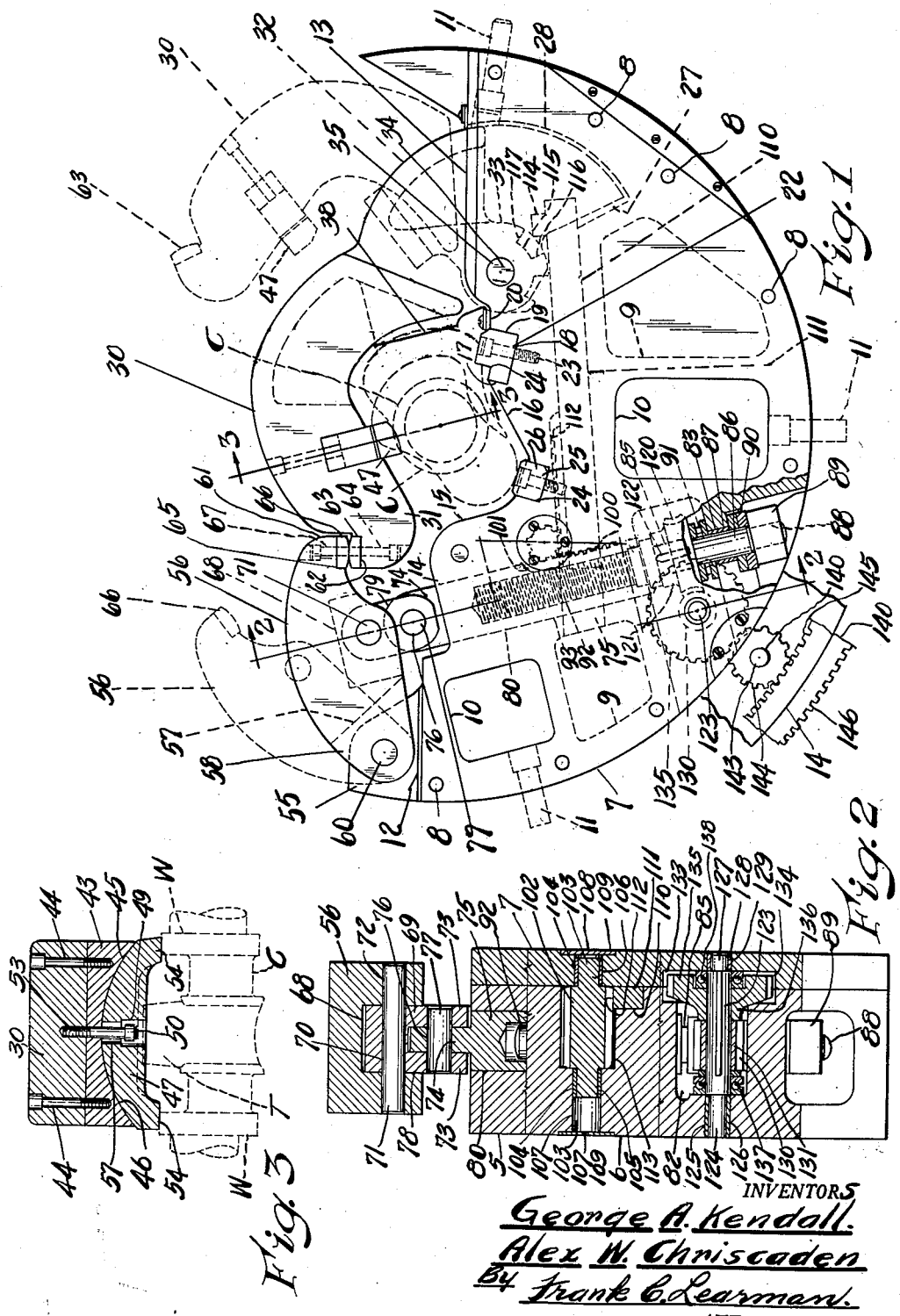
INVENTORS
George A. Kendall
Alex W. Chriscaden
BY Frank C. Learman
ATTORNEY Patented Mar. 2, 1954

2,670,646

UNITED STATES PATENT OFFICE 2,670,646

CENTER DRIVE CHUCK FOR CRANKSHAFT LATHES

George A. Kendall and Alex W. Chriscaden, Saginaw, Mich., assignors to Wickes Bros., a division of The Wickes Corporation, Saginaw, Mich.

Application December 15, 1950, Serial No. 201,013

17 Claims. (Cl. 82—40)

The present invention relates to power operated driving chucks for lathes, and more particularly to a center-drive chuck for center-drive crankshaft lathes.

One object of the invention is to provide a center-drive chuck having a movable work engaging jaw which is adapted to be moved into and out of engagement with the workpiece by power actuated mechanism, and which is also adapted to be locked and unlocked automatically by the same power actuated mechanism in timed relation with the operation of the jaw.

Another object is to provide a power actuated center-drive chuck in which the chuck cap or jaw is held in a locked position in tight work engaging relation with a workpiece such as a crankshaft to prevent the workpiece from being displaced and causing damage to various lathe parts.

Another object is to provide a center-drive lathe chuck having power operated mechanism for controlling the movement of the chuck jaw or cap, and to provide locking mechanism which is operated during the initial motion of the power operated mechanism to unlock the jaw or cap prior to the movement thereof out of work engaging relation with a workpiece. The power actuated mechanism also provides for the initial movement of the jaw or cap of the chuck when the power operated mechanism is reversed so that the cap will engage the work before the locking mechanism will engage the cap or jaw to lock the same in its operative work engaging position.

Another object is to provide a power operated chuck for center-drive lathes having a screw operated slide to exert a forceful locking action on the cap or jaw, and thereby tightly clamp the workpiece such as a crankshaft of irregular shape in the chuck against movement imposed thereon by the drag of the lathe tools.

Another object is to provide a power operated center-drive chuck having a screw operated actuating rod which will positively hold the locking lever in its operative position by reason of the thread pitch of said screw actuated rod, and thereby prevent the chuck jaw or cap from becoming loose and causing the workpiece to be displaced from its true center.

Another object is to provide a power operated center-drive chuck having a jaw operating member with a lost motion connection between the jaw and said member to enable the jaw to be moved to an open position after the screw operated actuator has released the locking lever and permit the cap or jaw to be moved to a closed position prior to the movement of the locking mechanism to its locked position.

Another object is to provide a fully automatic chuck for center-drive lathes in which the fixed and movable jaws of the chuck are provided with renewable inserts which may be replaced when worn without discarding the chuck body and other portions of the chuck, as well as the chuck jaw.

Another object is to provide a center drive chuck having a movable work engaging and clamping jaw which is provided with a self-alining work engaging driver for engaging spaced apart portions of a workpiece such as a crankshaft, thereby providing equal contactual engagement on spaced apart portions of the workpiece and effecting a tighter gripping action.

Another object is to provide a power operated driving chuck in which the power supplied from an external source and associated with the control mechanism is transmitted through the medium of an internal and external ring gear floatingly mounted in an annular chamber in the chuck body and lathe framework so that driving movement of the ring gear in opposite directions of angular movement will cause reciprocation of the actuator slide to effect the opening, closing and locking and unlocking motions of the jaw or cap and locking lever.

Another object is to provide a power operated center-drive chuck for crankshaft lathes which is fully automatic and will relieve the operator of fatigue in handling and loading the lathe.

Other objects and advantages of the invention will become apparent during the course of the following description of the accompanying drawings, wherein:

Figure 1 is a side elevational view of the center-drive chuck showing portions thereof broken away to illustrate various structural details of the power operated mechanism.

Figure 2 is a cross-sectional view taken on the cordal section line 2—2 of Figure 1 and looking in the direction of the arrows to illustrate the screw actuated slide and the manner in which the same is driven to control the chuck jaw or cap and the chuck jaw locking lever, and Figure 3 is a cross-sectional view taken on the radial line 3—3 of Figure 1 and looking in the direction of the arrows to illustrate the chuck jaw or cap, and the self-alining work engaging member carried thereby.

In the drawings, and more in detail, there is shown for the purpose of convenience of illustration a chuck body 5 generally designated, which is adapted to be mounted for rotation in a lathe frame and within an external ring gear in substantially the same manner as illustrated in Patent 2,511,741, issued to Richard E. Schulz, June 13, 1950. In this patent the chuck body is bolted to the inner periphery of a ring gear having external gear teeth which are engaged by a drive gear connected to a source of power such as a motor or the like to enable the chuck body to be rotated at the desired cutting speed. The ring gear is anti-frictionally mounted for rotation between a pair of vertical frame plates having openings slightly larger than the diameter of the inner periphery of the ring gear. Such center-drives for lathes are conventional and need not be described in the present case.

The chuck body 5 is formed of a half round steel casting 6 having a face plate 7 corresponding the shape thereto, and adapted to be bolted to the steel casting 6 by suitable fastening elements such as machine screws or the like 8 which are arranged at various locations. The steel casting 6 has certain portions thereof as at 9 cut away to reduce its weight, and similarly, the face plate 7 is provided with openings 10 at certain locations to reduce the weight of the chuck body 5. The chuck body 5 is adapted to be secured within the external ring gear (not shown) by means of radially extending machine screws 11 which are received in correspondingly threaded openings in the inner wall of said ring gear. The machine screws 11 extend through bores opening radially from the cutout portions 10 of the chuck body.

The chuck body formed by the steel casting 6 and face plate 7 is provided with radial walls 12 and 13 which are connected by an offset portion 14, a reversely curved edge wall portion 15, a straight wall portion 16 and a recessed portion having walls 17, 18 and 19. The wall 19 connects to an angular portion 20 of the radial wall edge portion 13, and thus it will be seen, that both the steel casting and the face plate are cut away to provide an opening for receiving a workpiece such as a crankshaft C having counterbalance webs W and crankpin throws T. Mounted in the recess formed by the angular wall edge surfaces 17, 18 and 19 is a locator block 22 which is held in place by a machine screw 23. The locating block 22 is notched as at 24 for receiving a projecting portion on the spaced counterbalance webs W. Similarly, the curved wall portion 15 is notched or cut away as at 24 to provide a recess for receiving a similar work engaging block positioned to engage one of the throws T of the crankshaft C. The block 25 is held in place by a machine screw 26 similar to the machine screw 23, and it is to be pointed out that by removing the blocks 22 and 25 when the same have become worn, they can be readily replaced to restore the accuracy of the center-drive chuck.

The steel casting 6 is provided with a sector-shaped opening 27 which extends inwardly from the radial wall 13, and is provided with a curved wall 28. The radial wall 27 forms a sector-shaped pocket or opening for a portion of the chuck cap or jaw which will be presently described.

The chuck cap or jaw 30 is of arcuate shape and is formed of a casting having an end portion 31 and an integral sector-shaped portion 32 at the opposite end thereof. Cast integral with the sector-shaped portion 32 is a lug 33 which extends between the walls of the sector-shaped opening 27 and is pivotally mounted to swing to and fro on a pivot pin 34 which is received in bearing openings 35 at each side of the steel casting 6, and extends through a corresponding bearing opening in the lug 33.

The chuck jaw 30 is provided with a flat surface 38 and backing plate or block 43 is mounted on the pivoted chuck cap 30 and is held in place by machine screws 44 (Fig. 3), said backing block 43 being provided with an arcuate surface 45 for receiving a correspondingly shaped surface 46 on a self-alining work engaging block 47. The self-alining block 47 is provided with a central bore 49 of increased diameter for receiving the enlarged head 50 of a machine screw 51. The machine screw 51 passes through a slot 52 entering the bore 49 and the free end is received in a correspondingly threaded internal bore 53 in the chuck jaw or cap 30. Formed at each end of the self-alining work engaging block 47 is a projection 54 for engaging counterbalance webs or other portions of a crankshaft C as at W (Fig. 3).

Extending upwardly from the radial wall 12 of the casting 6 is a lug 55 (Fig. 1) on which is pivotally mounted to rock to and fro, a locking lever 56 having one end cut inwardly as at 57 to provide spaced apart ears 58 adapted to straddle the lug 55. The lug 55 and ears 58 are provided with alined openings forming pin bearings for receiving a pivot pin 60. The opposite end of the locking lever 56 is provided with a projection 61 presented to the free swinging end of the chuck cap or jaw 30. The end 31 of the chuck cap or jaw is cut away as at 62 to provide a recess for receiving a removable contact block 63 which is held in place by a machine screw 64, and similarly, the end 61 of the locking lever 56 is cut away as at 65 for receiving a contact wear block 66 which is removably held in place by a machine screw 67 and is adapted to contactually engage the wear block 63 to lock the chuck jaw or cap 30 in its operative work engaging position. Through extensive use the contacting portions of the wear blocks 63 and 66 will become worn and hence, replacing of the blocks from time to time will increase the life of the chuck.

The intermediate portion of the locking lever 56 is cut away as at 68 to provide an opening for receiving a pivot link 69 having an opening 70 for receiving a pivot pin 71 which has its ends received in bearing openings 72 in the locking lever 56. A pair of spaced apart arms 73 are formed on the pivot link 69 to receive the upper reduced end 74 of an actuator slide 75. The reduced end 74 of the actuator slide 75 is provided with a bearing bore 76 for receiving a pivot pin 77 which has its ends received in bearing openings 78 in the pivot link arm 73.

The slide actuator 75 is slidably received in a tangential opening 80 (Figs. 1 and 2) in the form of a bore to permit the slide actuator 75 to be moved to and fro and thus rock the locking lever 56 as shown in dotted lines in Figure 1. The tangential bore 80 extends into an opening 82 in the casting 6, and co-axial with the bore 80 in the chuck body 6 is a bore 83 of slightly reduced diameter (Fig. 1).

Rotatably mounted in the bore 83 in the chuck body is an actuator shaft 85 having a reduced portion 86 which is supported in a bearing sleeve 87 in the bore 83. One end of the shaft 85 is threaded as at 88 for receiving a correspondingly threaded retaining nut 89. Thrust bearings 90 are interposed between the chuck body and the retaining nut 89 to prevent movement of the shaft 85 in one direction, and similarly, a thrust bearing assembly 91 is mounted on the reduced portion 86 of the shaft and is engaged by the shoulder formed between the enlarged portion 85 of the shaft to engage an opposite wall of the chuck body and prevent movement of the shaft 85 in the opposite direction.

The free end of the shaft 85 is threaded as at 92 and projects into a correspondingly threaded opening or bore 93 in the slide actuator 75 so that when the shaft 85 is rotated the slide actuator 75 will be moved to and fro to rock the locking lever 56 about the axis of the pivot pin 60, and since the upper flattened end 74 is pivotally connected to the locking lever 56 by the pivot link 79 the locking lever 56 will move to and fro as illustrated in dotted lines in Figure 1.

The innermost portion of the actuator slide 75 is provided with a series of rack teeth 100 to provide a rack bar extending to a point from the inner end of the slide actuator to a point as indicated at 101 (Fig. 1). The rack teeth 100 are adapted to engage an idle pinion 102 (Fig. 2) which has its ends as at 103 mounted in bearings 104 received in bearing openings 105 and 106 in the cast steel chuck body 6 and face plate 7 respectively (Fig. 2). Closure plates 107 and 108 are secured to the cast steel chuck body 6 and face plate 7 respectively by screws 109 to close the ends of the bearing openings 105 and 106.

Formed in the inner wall surface of the cast steel chuck body 6 is a groove 110 for slidably receiving a rack bar 111 having a series of rack teeth 112 along the upper edge thereof which project into the bore 113 and engage the teeth on the idler pinion 102. It is noted, that the idler pinion 102 is of considerable width so that the rack teeth 100 on the slide actuator 75 will drivingly engage the intermediate portion of the teeth on the idler gear 102, while the rack bar 111 will be driven by the teeth of the idler gear 102 adjacent one end thereof. Thus, it will be seen that when the actuator slide 75 is moved to and fro upon rotation of the screw actuator shaft 85 in opposite directions of rotation, the rack bar 111 will move to and fro in a direction substantially at right angles to the direction of movement of the slide actuator 75. One end of the rack bar 111 projects into the sector-shaped cavity formed by the radial and arcuate walls 27 and 28, and said end is provided with a projection 114 which is presented beneath the lug 33 on the sector-shaped extension 32 of the chuck jaw or cap 30. The projection 114 is adapted to be received in a notch 115 in the lug 33, and said notch is provided with spaced walls 116 and 117 which are spaced a greater distance apart than the opposed walls of the lug 114. This construction provides lost motion between the lug 114 and the notch 115 when the shaft 85 is rotated in a direction to unlock the locking lever 56 and swing the chuck jaw or cap 30 to an open position. Similarly, it provides for disengagement of the lug 114 from the notch 115 to permit the locking lever to be drawn into tight engagement with the chuck cap or jaw after the same has been closed.

Thus it will be seen, that when the shaft 85 is rotated in a direction to move the slide actuator 75 upwardly, the initial movement will disengage the locking lever 56 from the chuck jaw or cap 30 a sufficient distance so that when the lug 114 engages the wall 116 to swing the cap or jaw 30 out of its work engaging position, the locking lever 56 will be removed from the free swinging end 31 of the chuck jaw or cap 30. Upon continued movement of the actuator slide 75, the projection 114 will swing the lug 33 about the axis of the pivot pin 35 and thereby swing the chuck jaw or cap 30 to the dotted line position shown in Figure 1. Similarly, when the shaft 85 is rotated in the opposite direction the lug 114 will engage the wall 117 of the notch 115 and move the chuck cap or jaw 30 to its work engaging position. This movement is effected before the locking lever 56 has rocked a sufficient distance such that its free end 61 will overlap the free end 31 of the chuck jaw 30, and after the wear plates 63 and 66 have engaged, the shaft 85 may continue to rotate to exert a locking pressure on the locking lever 56 and chuck jaw or cap 30, due to the fact that the lug 114 will move out of engagement with the notch 115 upon said continued rotational movement to effect the final clamping action on the chuck jaw or cap 30. As the lug 114 moves out of engagement with the notch 115 in the pivot ear 33, the end of the rack bar 111 travels into the sector-shaped opening extending inwardly from the upper wall 13 of the cast steel chuck body 6 to the radial and arcuate walls 27 and 28.

The mechanism for rotating the shaft 85 clockwise or counter-clockwise as desired includes a worm wheel 120, which has its hub 121 keyed to the shaft 85 by means of a key and slot connection 122, said worm wheel 120 being located in the cut away portion 82 of the casting 6.

Arranged transversely of the shaft 85 is a shaft 123 which has one of its ends reduced as at 124 and mounted in a bearing sleeve 125 seated in a bearing opening 126 in the steel casting 6. The opposite end 127 of the shaft 123 is similarly reduced and is supported in a bearing sleeve 128 fitted in a bearing opening 129 formed in the face plate 7. A worm wheel 130 has its hub 131 keyed to the shaft 123, and the worm wheel 130 has its thread in driving engagement with the worm teeth on the worm gear 120. The forward portion of the casting 6 at one side of the opening 82 is cut away to provide an annular chamber 133, and similarly, the face plate 7 is cut away to provide an inwardly extending chamber 134 corresponding in shape to the cut away portion 133 to provide a space for receiving a gear 135 having its hub 136 keyed to the shaft 123 in substantially the same manner as the worm wheel 130. Thrust bearings of the ball or roller type 137 and 138 are mounted on the shaft 123 adjacent the ends thereof and disposed between the worm 130 and casting 6, as well as the pinion gear 135 and the face plate 7 respectively. It is noted that the pinion gear 135 is located on the right hand side of the shaft 123 (Fig. 2) so that its periphery will be disposed adjacent the peripheral edge of the chuck body 5.

The pinion gear 135 is adapted to be driven to control and actuate the chuck cap 30 and locking lever 56 by an internal and external ring gear 140 which is mounted in a cut away portion of the external driving ring gear in a manner similar to that shown in the R. E. Schulz Patent 2,511,741, issued June 13, 1950. A cover ring 141 is secured to the chuck body 5 or to the external driving ring gear (not shown), and said annular cover 141 is provided with a bearing opening 142 which is alined with a similar opening in the ring gear for rotatably supporting a shaft 143. Secured to the shaft 143 is an idler pinion 144 which is positioned to drivingly engage the pinion gear 135 on the shaft 123. The idler pinion 144 is drivingly engaged by the internal gear teeth 145 on the internal and external gear ring 140 such that rotation of the external and internal ring gear 140 clockwise or counter-clockwise will rotate the gears 144, 130, and thus impart rotation to the shaft 85 to control the chuck cap 30 and locking lever 56.

The outer peripheral portion of the ring gear 140 is provided with external gear teeth 146 which are adapted to be engaged by a driven shaft and gear in driving engagement therewith. The driven shaft may be controlled and powered likewise as shown in the Schulz patent above referred to.

The lathe frame is provided with an annular plate with its inner periphery spaced from the outer periphery of the annular plate 141 to cover the external teeth 146 of the ring gear 140. The driving gear (not shown) mounted on a drive shaft is presented in driving engagement with the external gear teeth 146 and rotates about a fixed axis in such a manner that the external and internal ring gear 140 may rotate with the chuck body 5 when a crankshaft C, or other workpiece is being turned. When the turning operation is completed, the chuck body 5 is arrested and the pinion in engagement with the external teeth 146 is rotated by a motor and drive shaft to rotate the ring 140 independently of the chuck body 5. In one direction of angular displacement the external and internal ring gear 140 will cause the locking lever 156 to be moved about its pivot 60 during the initial movement or rotation of the shaft 85. Upon continued rotation of the shaft 85 the rack teeth 100 will rotate the idler gear 102 in a direction to move the slide 110 to the left so that the lug 114 will engage the wall 116 of the notch 115 and swing the jaw or cap 30 to an open position.

After the crankshaft or work has been removed and replaced by another workpiece or crankshaft, the external and internal ring gear 140 will be driven in a direction opposite to the first mentioned direction so that the slide 75 will move downwardly and the slide 110 will move in a direction toward the right hand side of the chuck and engage the wall 117 of the notch 115 to thereby swing the chuck jaw or cap 30 to its closed position with the self-alining block 47 and plate 39 in engagement with proper portions of the counterbalance webs W. It must be understood that the crankshaft C is manually placed in the chuck so that one of the throws T will rest on the block 25 while a web portion projection will be seated in the notch 24 of the locator block 22, the blocks 22 and 25 extending across the entire width of the chuck, so that the crankshaft has bearing directly under each projection of the equalizer 47.

Upon continued rotation of the shaft 85, the slide 75 is moved downwardly so that the end 61 of the locking lever 56 will overlie the end 31 of the chuck jaw or cap 30 and thus move the chuck jaw or cap 30 into tight work engaging relation with the crankshaft C. Thus, it will be seen that considerable force is exerted on the locking lever by the actuator screw shaft 92, and that when the locking lever is in its final position it is prevented from being moved upwardly by the threaded driving connection between the shaft 85 and the slide 75.

When it is desired to change the seating blocks 22 and 25, as well as the self-alining work engaging plate 47 and the plate 39 after the same have become worn, the retaining screws may be removed and new blocks inserted. Thus, accuracy of the lathe is maintained without discarding portions of the chuck such as the jaw 30 or the chuck body 5. Similarly, when the contact plates 63 and 66 have become mutilated, they can be easily removed and replaced by newly machined blocks to provide slightly curved contacting surfaces which insures smooth operation of the locking lever 56 when the same is moved into locking engagement with the end 31 of the chuck jaw or cap 30.

It is to be understood that the form of the invention herewith shown and described is to be taken as a preferred embodiment of the invention, and that various changes in the shape, size and arrangement of parts may be resorted to without departing from the spirit of the invention or the scope of the subjoined claims.

We claim:

1. In a chuck for a center-drive lathe, a chuck body, fixed and movable chuck jaws on said body for clamping the work, locking means pivotally mounted on said chuck body and swingable into engagement with said movable chuck jaw to hold said movable chuck jaw in a work engaging position, and mechanism operable to move the movable chuck jaw into work engaging relation and out to loading and unloading position, said mechanism simultaneously controlling said locking means and operating it in timed relation with respect to said movable chuck jaw.

2. In a chuck for a center-drive lathe, a chuck body adapted to be rotated, fixed and movable work holding jaws on said body, locking means pivotally mounted on said chuck body and swingable into engagement with said movable chuck jaw to hold the movable jaw in a work engaging position, and mechanism operable to control the locking means and simultaneously shift the movable jaw from a position sufficiently removed from said fixed jaw to permit loading and unloading of the work into work engaging relation, said mechanism being also operable to simultaneously control the locking means and return the jaw to loading position.

3. In a chuck for a center-drive lathe, a chuck body, fixed and movable work holding jaws on said chuck body, locking mechanism pivotally mounted on said chuck body and swingable into clamping engagement with said movable chuck jaw to hold the movable jaw in work engaging relation, and operating mechanism driven from a single power source for moving said movable jaw from loading position into work engaging relation in advance of the operation of said locking mechanism and simultaneously controlling said locking mechanism.

4. In a work holding chuck for a center-drive lathe, a chuck body, fixed and movable work holding jaws on said body, locking mechanism for holding said movable jaw in work engaging relation, slide means for controlling said locking mechanism, slide means for controlling said movable jaw, said means for controlling the locking mechanism and the movable jaw being connected in driving relationship, a lost motion connection between the slide means for controlling the locking mechanism and the means for controlling the movable jaw, and driving means in driving engagement with the slide means for controlling said locking mechanism.

5. In a work holding chuck for a center-drive lathe, a chuck body, a movable work holding jaw on said body, locking mechanism for holding said movable jaw in work engaging relation, a screw operated slide for controlling said locking mechanism, a rack slide for controlling said movable jaw, means for drivingly interconnecting said screw and rack slides, a lost motion connection between the rack slide and movable jaw to permit said jaw to close in advance of the locking mechanism and open after operation of the locking mechanism, a rotary screw shaft for controlling said screw slide and external motor means drivingly connected to said rotary screw shaft.

6. In a chuck for a center-drive lathe, a chuck body, fixed and movable work holding jaws on said body, locking mechanism for holding said movable jaw in work engaging relation, a screw operated slide for controlling said locking mechanism, a rack slide for controlling said movable jaw, means drivingly connecting said screw and rack slides, a lug and notch connection between said rack slide and movable jaw to permit said locking mechanism to operate in advance of said movable jaw to unlock said jaw, a rotary screw shaft for driving said screw slide, gearing for rotating said screw shaft and external power means for driving said gearing in opposite directions of rotation.

7. In a work holding chuck for a center-drive lathe, a chuck body having a fixed jaw, a movable jaw rockably mounted on said chuck body to swing to and fro with respect to said fixed jaw, a locking lever pivoted to said chuck body and arranged to be moved into and out of engagement with the free swinging end of said movable jaw, a slide actuator for said locking lever, a rack slide for said movable jaw, means for drivingly interconnecting the actuator and rack slides, a lost motion connection between the rack slide and movable jaw and an actuator screw for controlling the movement of said slide actuator.

8. In a chuck for a center-drive lathe, a chuck body having a recess to form a fixed jaw, a movable jaw rockably mounted on the chuck body to cooperate with the fixed jaw, a locking lever pivoted to said chuck body and arranged to engage the free swinging end of said movable jaw, a slide actuator for said locking lever, a rack slide driven by said actuator slide for controlling the movable jaw, a rotary screw shaft journaled in said chuck body to control said actuator slide, reduction gearing for driving said rotary screw shaft and external power means for driving said reduction gearing.

9. In a chuck for a center-drive lathe, a chuck body shaped to provide a fixed work receiving jaw, a movable jaw rockably mounted on said chuck body to cooperate with said fixed jaw, a locking lever pivoted to said chuck body and arranged to engage the free swinging end of said movable jaw, a slide actuator for controlling said locking lever, a rack slide for controlling the movable jaw, a gear drivingly interconnecting said actuator and rack slides, a lost motion connection between said rack slide and movable jaw to permit the locking lever to be operated in advance of the movable jaw during work releasing movement of the locking lever, a rotary screw shaft for controlling said slide actuator, worm gearing in said chuck body drivingly connecting said rotary screw shaft, an external and internal ring gear rotatably mounted about said chuck body having its internal teeth in driving engagement with said worm gearing and external driving mechanism drivingly engaging the external teeth of said ring gear.

10. In a chuck for a center-drive lathe, a chuck body having a cut away portion to provide a fixed work receiving jaw, a movable jaw rockably mounted on said chuck body to cooperate with said fixed jaw, a locking lever pivoted to said chuck body and arranged to engage the free swinging end of said movable jaw to hold the same in a locked position, a slide actuator pivotally connected to said locking lever, a rack slide adapted to be driven in unison with said slide actuator for controlling the movable jaw, a lost motion connection between said rack slide and movable jaw to permit the locking lever to be moved out of the path of said movable jaw when releasing work between said jaws, a screw shaft for controlling said slide actuator, an external and internal ring gear rotatably supported on said chuck body, an idler gear in mesh with the internal teeth of said ring gear, worm and worm wheel gearing drivingly connecting said idler gear to said rotary screw shaft and external power means in driving engagement with the external teeth of said ring gear.

11. The combination as defined in claim 13 in which an insert is provided on said locking lever, and said movable jaw is shouldered and a cooperating insert is provided thereon.

12. In a work-holding chuck for a center-drive lathe, a chuck body having a cut-away portion to provide a fixed work-receiving jaw, a finger-like jaw pivotally mounted off-center in said chuck body and swingable over said fixed jaw to work-engaging position, an oppositely disposed locking member pivoted to said chuck body and swingable over said finger-like jaw to clamp it it work-engaging position, and operating mechanism driven from a single power source for moving said finger-like jaw into and out of work-engaging relation and simultaneously controlling said locking member, to lock said finger-like jaw after said jaw has been swung to work-engaging position and unlock said jaw prior to swinging said jaw to a position sufficiently removed from said fixed jaw to permit unloading of the work.

13. In a work-holding chuck for a center-drive lathe, a semi-circular chuck body having a cut-away portion to provide a fixed work-receiving jaw, a finger-like jaw pivotally mounted off-center in said chuck body and swingable over said fixed jaw to work-engaging position, an oppositely disposed locking member pivoted to said chuck body and swingable over said finger-like jaw to clamp it in work-engaging position, an actuator slide mounted in the chuck body having one end pivoted to the locking member, a rack slide mounted in said chuck body for controlling said movable jaw, a lug and notch connection between said rack slide and jaw to permit the locking lever to be moved to a position out of the path of the finger-like jaw before the jaw is operated, means drivingly interconnecting the rack slide and actuator slide, a rotary screw shaft in threaded engagement with said actuator slide, an external and internal ring gear rotatably mounted on the chuck body, gearing in the chuck body drivingly connecting the internal teeth of the ring gear to said rotary screw shaft, and external power means in driving engagement with the external teeth of said ring gear.

14. The combination as defined in claim 13 in which said chuck body is provided with a vertically inclined passage and said slide actuator is disposed therein, and the chuck body is further provided with an intersecting, substantially horizontal passage and said rack slide is disposed therein.

15. In a chuck for a lathe, a chuck body, fixed and movable work holding jaws on said chuck body, locking means movable into engagement with said movable jaw to hold the movable jaw in work-engaging relation, and operating mechanism to move the movable jaw from a position sufficiently removed from said fixed jaw to permit loading and unloading of the work into work engaging relation prior to operation of the locking means and out of work engaging position after operation of said locking means, said mechanism simultaneously controlling the locking means.

16. In a work holding chuck for a center drive lathe, a chuck body, fixed and movable work holding jaws on said body, locking mechanism for holding said movable jaw in work engaging relation, means for operating said locking mechanism and said movable jaw, a lost motion connection between said means and said movable jaw to permit the movable jaw to close in advance of the locking mechanism and open only after operation of the locking mechanism.

17. In a chuck for a lathe, a fixed work holding jaw, a movable work holding jaw supported thereon, locking means movable into engagement with the movable jaw to hold the latter in work engaging relation, and operating mechanism supported on the fixed work holding jaw to move the movable jaw from a position sufficiently removed from said fixed jaw to permit loading and unloading of the work into substantially work engaging relation prior to operation of the locking means and out of work engaging position substantially after operation of said locking means, said mechanism simultaneously controlling the locking means.

GEORGE A. KENDALL.
ALEX W. CHRISCADEN.

References Cited in the file of this patent

UNITED STATES PATENTS

| Number | Name | Date |
|---|---|---|
| 2,236,057 | Groene | Mar. 25, 1941 |
| 2,249,240 | Groene et al. | July 15, 1941 |
| 2,250,631 | Groene et al. | July 29, 1941 |
| 2,320,983 | Groene et al. | June 1, 1943 |
| 2,354,009 | Groene et al. | July 18, 1944 |
| 2,354,258 | Groene | July 25, 1944 |
| 2,471,162 | Meyer | Oct. 27, 1945 |
| 2,509,888 | Schulz | May 30, 1950 |
| 2,511,741 | Schulz | June 13, 1950 |
| 2,544,966 | Schulz | Mar. 13, 1951 |